(12) United States Patent
Briles

(10) Patent No.: US 8,170,079 B2
(45) Date of Patent: May 1, 2012

(54) CODE DIVISION MULTIPLE ACCESS SIGNALING FOR MODULATED REFLECTOR TECHNOLOGY

(75) Inventor: Scott D. Briles, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 1089 days.

(21) Appl. No.: 10/628,677

(22) Filed: Jul. 28, 2003

(65) Prior Publication Data

US 2005/0025218 A1 Feb. 3, 2005

(51) Int. Cl.
*H04B 1/69* (2011.01)

(52) U.S. Cl. ........ 375/130; 375/140; 375/141; 375/146; 375/147; 375/268; 375/269; 375/295; 375/300; 375/316

(58) Field of Classification Search .................. 375/268, 375/269, 300
See application file for complete search history.

(56) References Cited

U.S. PATENT DOCUMENTS

| | | | |
|---|---|---|---|
| 4,499,594 A * | 2/1985 | Lewinter | 704/226 |
| 6,147,605 A * | 11/2000 | Vega et al. | 340/572.7 |
| 6,434,194 B1 * | 8/2002 | Eisenberg et al. | 375/238 |
| 6,456,225 B1 * | 9/2002 | Forster | 342/12 |
| 6,509,836 B1 * | 1/2003 | Ingram | 340/572.4 |
| 6,838,989 B1 * | 1/2005 | Mays et al. | 340/572.1 |
| 6,914,528 B2 * | 7/2005 | Pratt et al. | 340/572.1 |
| 7,046,957 B1 * | 5/2006 | Farr et al. | 455/11.1 |
| 2002/0128052 A1 * | 9/2002 | Neagley et al. | 455/575 |
| 2003/0137449 A1 * | 7/2003 | Vashisth et al. | 342/357.08 |
| 2003/0232600 A1 * | 12/2003 | Montgomery et al. | 455/67.11 |
| 2004/0005863 A1 * | 1/2004 | Carrender | 455/41.1 |

OTHER PUBLICATIONS

An impedance-modulated-reflector system, Potentials, IEEE, vol. 18, issue 4, Oct.-Nov. 1999 pp. 29-33.*

* cited by examiner

*Primary Examiner* — Siu Lee

(74) *Attorney, Agent, or Firm* — Milton D. Wyrick; Meredith H. Schoenfeld; Samuel M. Freund

(57) ABSTRACT

A method and apparatus for utilizing code division multiple access in modulated reflectance transmissions comprises the steps of generating a phase-modulated reflectance data bit stream; modifying the modulated reflectance data bit stream; providing the modified modulated reflectance data bit stream to a switch that connects an antenna to an infinite impedance in the event a "+1" is to be sent, or connects the antenna to ground in the event a "0" or a "−1" is to be sent.

6 Claims, 4 Drawing Sheets

CODE DIVISION MULTIPLE ACCESS SIGNALING FOR MODULATED REFLECTOR TECHNOLOGY

This invention was made with Government support under Contract No. W-7405-ENG-36 awarded by the U.S. Department of Energy. The Government has certain rights in the invention.

FIELD OF THE INVENTION

The present invention generally relates to personal communication technology, and more specifically, to the use of multiple access signaling with modulated reflector technology.

BACKGROUND OF THE INVENTION

Code Division Multiple Access (CDMA) signaling is used extensively in cellular phone systems, and in the Global Positioning System (GPS). CDMA signals, in their true form, use the same center frequency, but form individual identifying codes based on each user's phase modulation. The particular pattern of this phase modulation is determined by a set of orthogonal or nearly orthogonal codes. In order to acquire an individual signal, the code for that signal must be used to correlate with the received signal. In this way, several information-transmitting entities can operate within the same radio-frequency band, and an information-receiving station can distinguish between the different entities.

A good example of the application of CDMA is with the GPS, where binary-phase-shift keying (BPSK) is used as the base modulation to create the individual signal codes. In this application, one phase of the carrier would represent a "1," and a phase 180° from the first phase would represent a "0." Contiguous phase shifts create a binary code that, when correlated with a copy of itself, allow for the code to be separated from other codes embedded in the RF bandwidth. One implementation of the correlation is to sample and quantize the received signal to form an array of sampled values that contain a code or codes. To determine if a particular code is present, that code is first represented as a sampled RF signal, and then correlated against the received signal. If the sampled, received signal contains the particular code, a correlation peak is produced, which could be either positive or negative. The polarity of the correlation provides the phase modulation that transmits the true information. Thus, the code modulation is the conduit for the true information.

Conveying information through code modulation allows the effective transmission of information when signal-to-noise ratios are very small. This is often the case with modulated reflectance communications, which experience an attenuation of signal strength proportional to the inverse of the distance to the fourth power ($A \propto 1/D^4$), where distance is between the information source and the information receiver. Conventional RF communications, in which the information source transmits RF power, experience attenuation proportional to the inverse of the distance squared ($A \propto 1/D^2$). Modulated reflectors, when illuminated by RF energy, will reflect the energy back toward the RF source, and do it in such a way as to modulate the signal for the CDMA process. See U.S. Pat. No. 6,434,372 B1, issued Aug. 13, 2002, to Neagley et al. All patents referred to herein are included herein in their entirety for all purposes.

Modulated reflectors inherently are capable of producing BPSK modulation. The wave reflected from the apparatus can have either a 0° phase shift, or a 180° phase shift depending on the impedance seen by the wave. The usual modulated reflectance apparatus has an antenna of known characteristic terminated with a mismatched impedance, such as an open circuit or a short circuit. Using this knowledge, a code modulation can be implemented by forcing the impedance match to be either an open or a short, depending on the code associated with CDMA signaling.

SUMMARY OF THE INVENTION

In order to achieve the objects and purposes of the present invention, and in accordance with its objectives, a method of utilizing code division multiple access in modulated reflectance transmissions comprises the steps of generating a phase-modulated reflectance data bit stream; modifying the phase-modulated reflectance data bit stream to increase its bit rate; providing the modified phase-modulated reflectance data bit stream to a switch that connects an antenna to an infinite impedance in the event a "1" is qued to be sent, or connects the antenna to ground in the event a "0" is sent.

In a further aspect of the present invention, and in accordance with its principles and objectives, apparatus for utilizing code division multiple access in modulated reflectance transmissions comprises a modulated reflectance unit generating a phase-modulated data bit stream at a pre-selected rate, and a coder receiving the phase-modulated data bit stream for modifying the phase-modulated data bit stream and increasing said pre-selected rate. A switch receives the modified data bit stream and connects an antenna to an infinite impedance "1" is sent, and connects the antenna to ground if a "0" is sent.

In a still further aspect of the present invention, and in accordance with its principles and objectives, a method of utilizing code division multiple access in modulated reflectance transmissions comprises the steps of: generating a phase-modulated reflectance data bit stream; converting the phase-modulated reflectance data bit stream to bipolar states of "+1s" and "−1s;" generating square waves; multiplying the square waves with the bipolar states; and providing the multiplication to a switch that connects an antenna to an infinite impedance in the event a "+1" is to be sent, or connects the antenna to ground in the event a "−1" is to be sent.

In a yet further aspect of the present invention, and in accordance with its principles and objectives, apparatus for utilizing code division multiple access in modulated reflectance transmissions comprises square wave generation means for outputting square waves, and a modulated reflectance unit generating a phase-modulated reflectance data bit stream. Convertor means convert the phase-modulated reflectance data bit stream to bipolar states of "+1" and "−1," and multiplication means multiply together the square waves and the bipolar states. A switch receives the multiplication and connects an antenna to an infinite impedance in the event a "+1" is qued to be sent, and to ground in the event a "−1" is qued to be sent.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION

Figure 1:
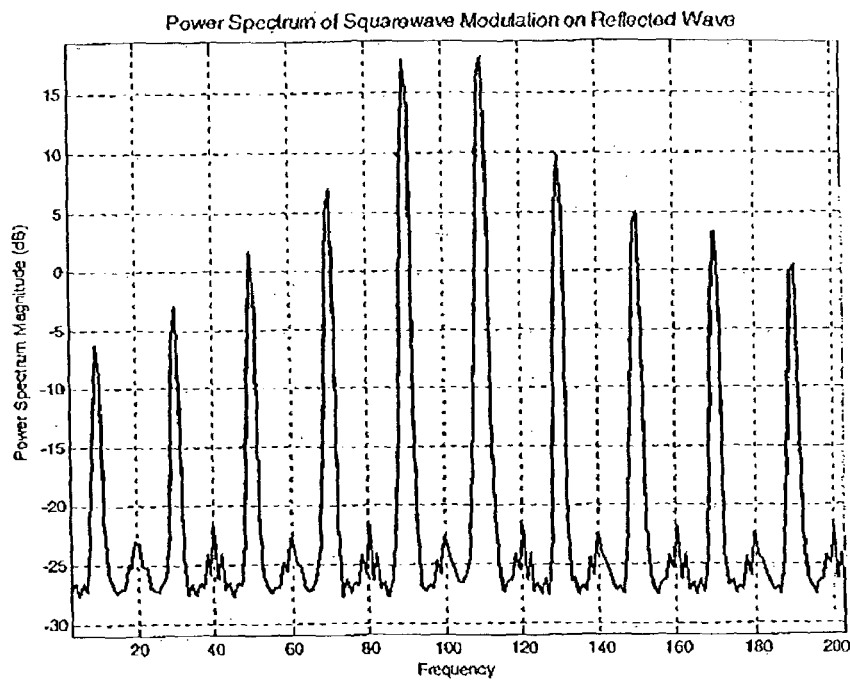
FIG. 1 is a graph of the power spectrum of square wave modulation on a reflected waveform.

The present invention applies Code Division Multiple Access (CDMA) signaling to modulated reflector technology to provide multiple access for that technology. The invention can be most easily understood through review of the following description and the drawings.

The application of BPSK modulation to modulated reflector technology achieves CDMA signaling. At specified time intervals, the matching impedance of a modulated reflector antenna can be either an open or a short, so that the antenna reflects a signal that either is in-phase or 180° out of phase with the RF illuminating source. The inverse of the specified time intervals is the phase change rate, which often is referred to as the chip rate. Thus, the code is created by either having a mismatch of an open to represent one binary state (e.g. "1"), or a mismatch of a short to represent the other binary state (e.g. "0"). This process creates the pseudorandom noise (PRN) code, which allows for the spreading of the reflected RF energy over the spectral bandwidth.

In the present invention, information transmission is accomplished in several ways, depending on the particular configuration desired. With CDMA signaling, each code can be used to represent a difference symbol in a M-ary information code. Such a signaling system would be used with a single RF-illuminator and a single modulated reflector. If a plurality of modulated reflectors are present, individual code entries can be used as a "1" or "0" symbol, and can be attributed to a particular modulated reflector unit. In this case, the modulated reflector units could have alphabets of different sizes. For example, some units could use a binary code and other units could use a ternary code. However, the standard form of CDMA is to allow for modulation upon the code itself with each individual reflector having its own PRN code sequence.

With each modulated reflector unit having its own PRN code sequence, the modulation would be in the phase of the code sequence. As an example, the two phase of one code might be "11010" and "00101." In this manner, when the receiver of the modulated reflector unit's signal correlates the given code with the captured RF signal, the correlation peak will be either positive or negative. Either polarity with a large amplitude serves to verify a known modulated reflector is communicating, and a bit of information is being provided. Of course, the transmission of a bit of information is not limited to a single correlation peak, but could be represented by statistics of 20 correlation peaks, thus improving the sensitivity of the receiver even more.

The use of CDMA modulation with modulated reflector technology is desirable to aid in counteracting the greater signal attenuation, and in isolating the signal carrying the modulation from the transmitted carrier. Because modulated reflector systems experience attenuation in power that is proportional to the inverse of the fourth power of the distance of communication, the signal carrying the information may be below the noise floor of the receiving system.

CDMA allows for signals below the power noise floor to be recovered. In a modulated reflector system, a strong carrier signal is transmitted from a base station; this carrier is reflected by a modulated reflector unit in manner that modulates the signal with information; and the weak, reflected information-carrying signal is received and demodulated by the base station. The isolation of these two signals in the receiving system is difficult, as leakage of the strong carrier signal will appear in the receiver electronics. However, CDMA, through the use of correlation, is capable of "despreading" or narrowing the "bandwidth" of the signal with the desired PRN, and spreading or widening the "bandwidth" of carrier interference. Thus, the information-carrying signal power is concentrated in the correlation delay time, and the power of the any interference is diluted in the correlation delay time, allowing for delay-time selection to isolate the information.

When the difference in power between the received, information bearing signal and the interfering, carrier leakage is large, BPSK modulation of a subcarrier is required, as the ability of CDMA to reject carrier leakage is limited. In order to overcome high-power leakage, a modulated reflector unit must produce a subcarrier upon which BPSK modulation can be imposed. Such modulation of the subcarrier can be accomplished by switching a square wave between a short and an open. In this manner, square wave modulation of a specified frequency can be placed onto the reflected carrier wave. This technique is described in a recently filed U.S. patent application, Ser. No. 10/187,025, filed Jun. 28, 2002, by Briles et al.

An example plot of the power density of this square wave modulation on the modulated reflector carrier is illustrated in FIG. 1. As seen, the true carrier frequency ($f_c$) is 100 Hz, but by modulating the carrier with a square wave having a frequency of 10 Hz, theoretically the carrier can be eliminated, and thus aid in demodulation at the receiver. This modulation can be expressed as:

$$s(t) = \text{square}(2\pi f_{sq} t) \cdot \cos(2\pi f_c t) \qquad 10$$

where square denotes a square wave function that oscillates between the values of ±1 with a frequency $f_{sq}$. An integer multiple relationship between the two frequencies aids in the suppression of the carrier frequency. Thus, the following restrictions apply:

$$f_{sq} < f_c, \text{ and} \qquad 11$$

$$f_c = N f_{sq}, \qquad 12$$

where N is a positive integer.

With the square wave placed onto the reflected carrier, BPSK modulation can be placed onto the square wave modulation to convey information. This is accomplished by determining the phase of the square, wave every M cycles, where M is a positive integer. The message symbol set can be defined as $m(kT_b) \in \{1, -1\}$, where k is a symbol index in time, and $T_b$ is the period of a symbol. Now, the expression for the reflected wave becomes:

$$s(t) = m(kT_b) \cdot \text{square}(2\pi f_{sq} t) \cdot \cos(2\pi f_c t). \qquad 13$$

The restrictions upon frequency are:

$$1/T_b < f_{sq}, \text{ and} \qquad 14$$

$$f_{sq} = M/T_b. \qquad 15$$

Figure 2:
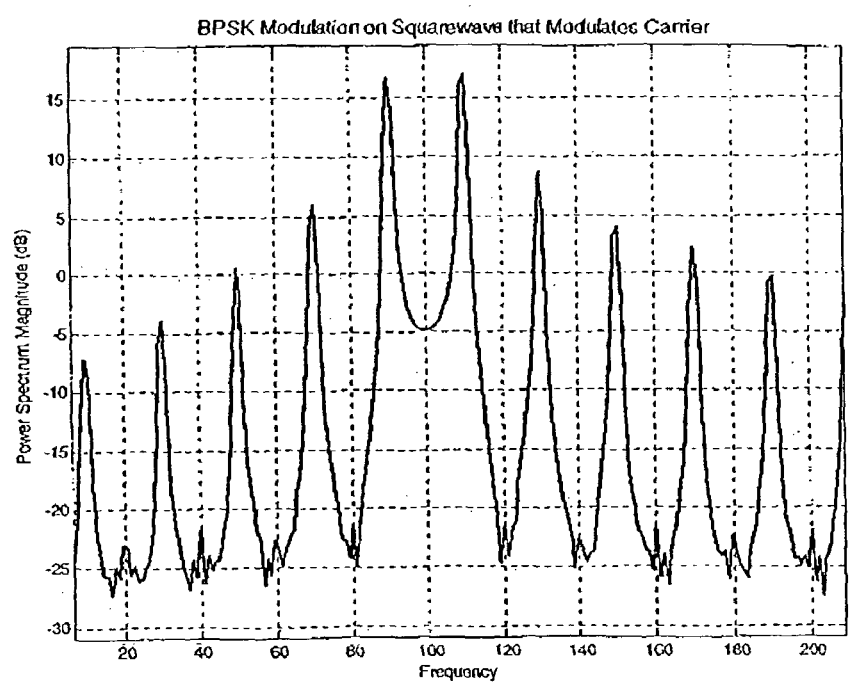
FIG. 2 is a graph of BPSK modulation on a square wave subcarrier that modulates a carrier.

FIG. 2 illustrates an example of the power spectrum of a reflected carrier that has been modulated by a square wave containing BPSK modulation.

The BPSK modulation placed onto the square wave can now be used as the foundation for the CDMA signaling. By using a subcarrier, the information-carrying signal is separated in frequency from the original carrier frequency. This separation in frequency aids in the demodulation of the signal at the receiver.

Figure 3:
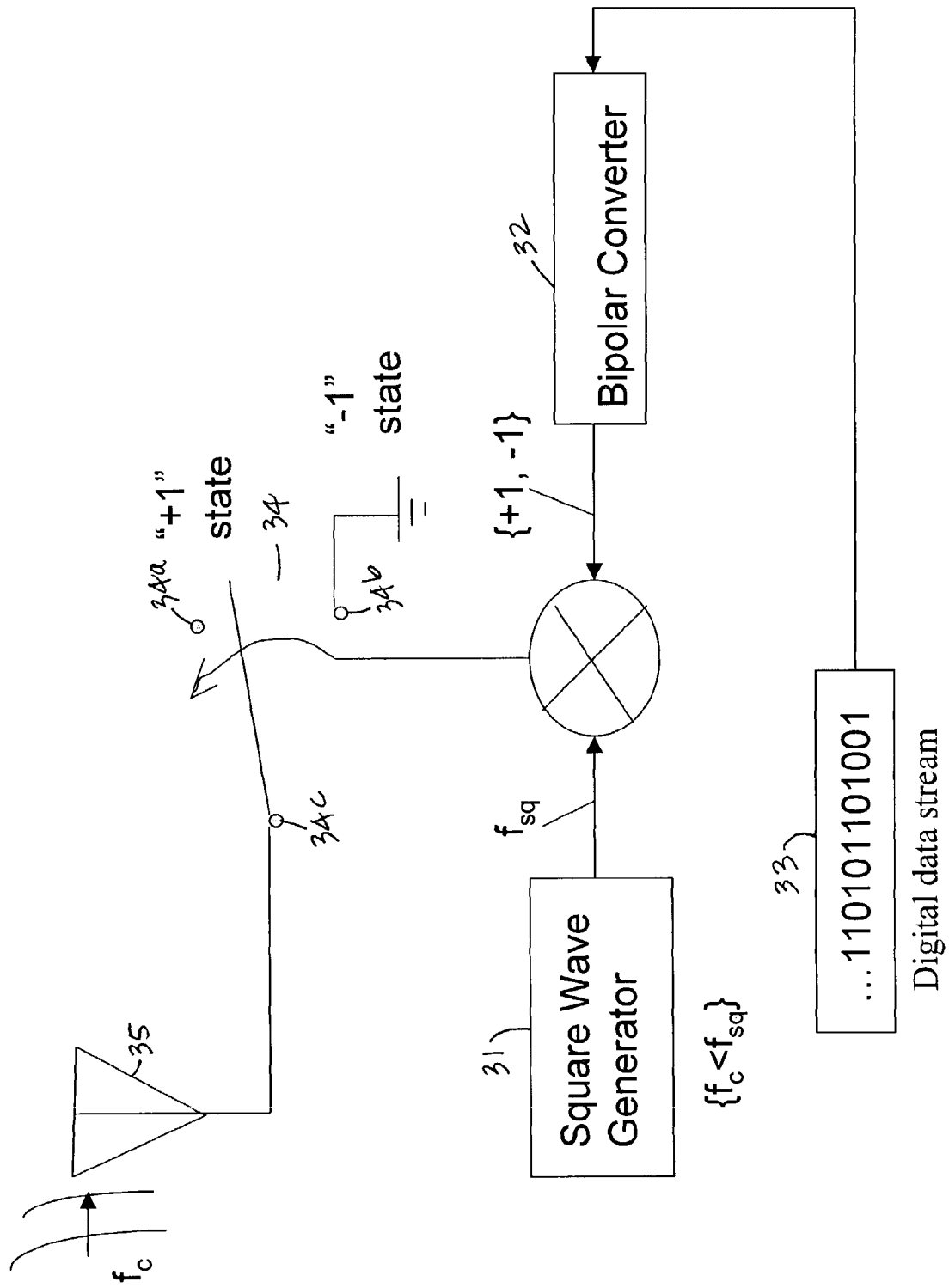
FIG. 3 is a schematic diagram illustrating an arrangement for introducing BPSK modulation into a modulated reflectance signal using square wave modulation.

An embodiment for placing BPSK modulation onto a square wave is illustrated schematically in FIG. 3. As seen, the square wave output of square wave generator 31 is multiplied with the output of bipolar converter 32, which is a series of "+1's" and "−1's" according the input binary characters from phase-modulated digital data stream 33. As indicated, the frequency of the incoming carrier, $f_c$, is less than the frequency of the square wave, $f_{sq}$. The multiplication of $f_{sq}$ and the series of "+1's" and "−1's" controls modulation switch 34, causing it to switch from the "+1" state at switch contact 34a, to the "−1" state at switch contact 34b according to the digits of phase-modulated digital data stream 33. With modulation switch 34 in the "+1" state, antenna 35, connected to switch contact 34c, encounters an infinite impedance, but with modulation switch 34 in the "−1" state, antenna 35 encounters a zero impedance as it is connected to ground.

Figure 4:
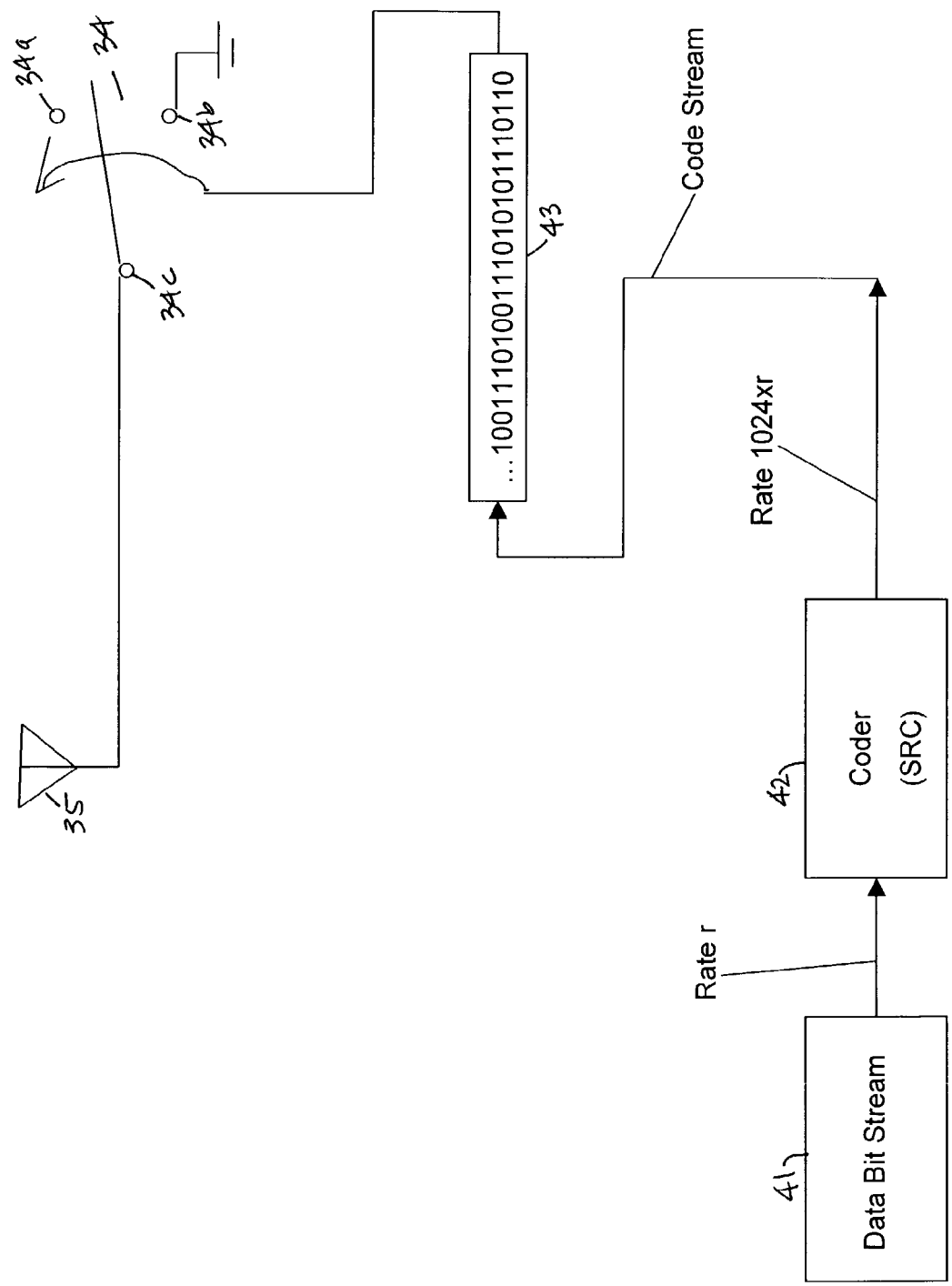
FIG. 4 is a schematic diagram illustrating another embodiment of the present invention for introducing BPSK modulation into a modulated reflectance signal.

Another embodiment for introducing BPSK modulation to a modulated reflector signal to achieve CDMA signaling in a reflected modulation system is illustrated in FIG. 4. As seen, phased-modulated data bit stream 41, at a constant rate, r (bits/second), is the output of a modulated reflectance unit. This data output is provided to coder 42, where the data rate is increased to 1024•r. This data is then provided to buffer 43 that serves to control modulation control switch 34. In the case of a "1," modulation control switch 34 connects modulation control switch contacts 34a and 34c, connecting antenna 35 to an infinite impedance. But for a "0," modulation control switch contacts 34b and 34c, are connected, effectively grounding antenna 35. This provides the 180° degree phase difference between a "1" and a "0" to implement the BPSK modulation.

Since CDMA signaling relies on correlation to identify codes, the amplitude of each signal must be balanced in a multi-reflector system. However, the PRN codes, most likely, are not orthogonal to each other. Therefore, there will be some correlation response (i.e. a correlation peak) between different codes. Should one received code have a very strong RF signal associated with it, it may produce a greater correlation peak with another code than it would with its true, but RF weak, received code. To prevent this from occurring, it is preferable that all the codes have approximately the same energy at the receiver.

In a conventional CDMA system, the power level of the transmitters are adjusted to be approximately the same. For a modulated reflector system, the amount of energy reflected must be approximately the same. Recalling that the two states used in the present invention for phase modulation of a modulated reflector are open and short, then should the impedance of the load be matched to the antenna, instead of on open or short, no RF energy would be reflected to the illuminator. In between matched impedance and open (i.e. a load of infinity) and matched impedance and short (i.e. a load of zero), values of impedance match can be introduced where some of the energy is reflected with the proper phase and the remainder of the energy is absorbed.

One method of adding resistance to the load is to have resistors in the open and short positions. As the two resistors approach matched impedances, the amount of the reflected energy would decrease. Of course, when the resistors represent an equally matched impedance, no energy would be reflected to the illuminator.

Figure 5:
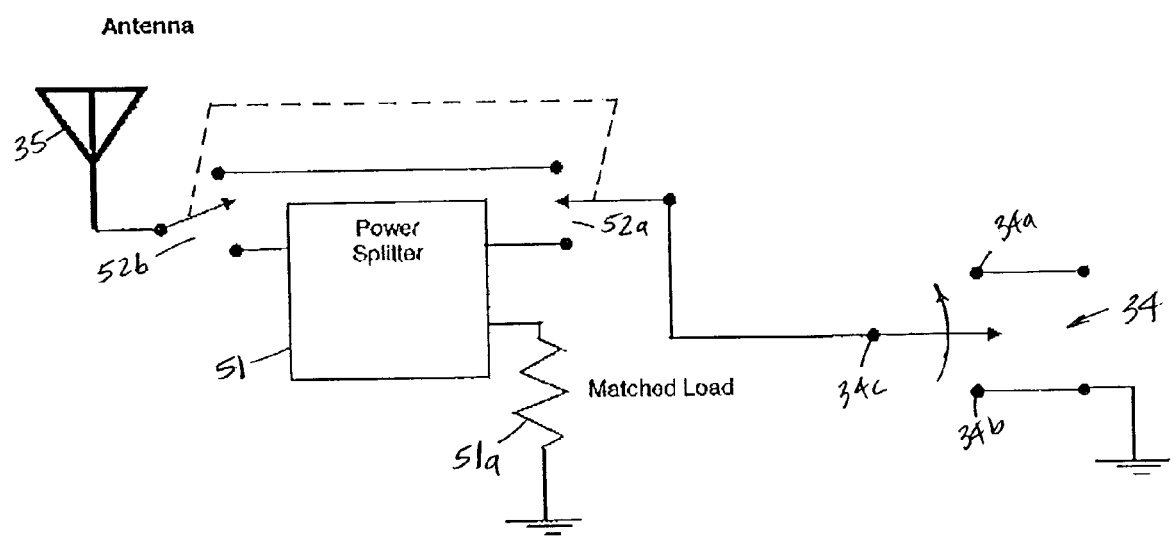
FIG. 5 is a schematic diagram illustrating a circuit for providing control of the output of a modulated reflectance system through the use of at least one power splitter.

Another approach is to use a series of power splitters and switches useful for any embodiment of the present invention. FIG. 5 shows such an example arrangement with a single power splitter 51. Modulation control switch 34 (also shown in FIGS. 3 and 4), is a single-pole, single-throw switch that selects either an infinite impedance if a "+1" is to be sent, or grounds antenna 35 if a "0" or "−1" is to be sent. The output at contact 34c of modulation control switch 34 is connected to power shunting switch 52a, a double-pole, single-throw switch that serves to connect contact 34c either directly to antenna 35 or through power splitter 51. Power splitter 51 serves to reduce the level of the signal by passing a portion to ground through resistance 51a and the remainder through power shunting switch 52b to antenna 15. Of course, this only occurs when a "+1" has been selected to be sent. When a "0" or "−1" is to be sent, power shunting switch 52a,b connects antenna 35 to contact 34b of modulation control switch 34, a zero impedance. It is easy to understand how this circuit could be cascaded so that desired levels of control of modulated reflectance output of the present energy can be easily attained.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of utilizing code division multiple access in modulated reflectance of transmissions comprising the steps of:
   generating a data bit stream;
   coding said data bit stream to increase its bit rate;
   providing said data bit stream to a switch that selectively connects an antenna to at least one power splitter such that the antenna has a high impedance in the event a "1" is to be sent a low impedance in the event a "0" is to be sent, wherein the at least one power splitter connects at least one matched load to the antenna, and wherein the matched load is also connected to the ground;
   receiving a return signal from a modulated reflector, wherein the return signal has two reflection states;
   switching the phase of the return signal between the two reflection states; and
   creating one or more subcarriers by switching the impedance between the two reflection states.

2. The method as described in claim 1, wherein said at least one power splitter is one power splitter.

3. Apparatus for utilizing code division multiple access in modulated reflectance transmissions comprising:
   a modulated reflectance unit generating a phase-modulated data bit stream at a pre-selected rate;
   a coder receiving a data bit stream for having a pre-selected rate wherein said coder modifies said data bit stream by increasing said pre-selected rate;
   a switch receiving said data bit stream and connecting an antenna to at least one power splitter such that the antenna has a high impedance in the event a "1" is to be sent a low impedance in the event a "0" is to be sent, wherein the at least one power splitter connects at least one matched load to the antenna, and wherein the matched load is also connected to the ground; and one or more subcarriers, wherein the subcarrier are created by switching the impedance between two reflective states.

4. The apparatus as described in claim 3, wherein said at least one power splitter is one power splitter.

5. A method of utilizing code division multiple access in modulated reflectance transmissions comprising the steps of:

generating data bit stream;

converting data bit stream to bipolar states of "+1s" and "−1s;"

generating square waves;

multiplying said square waves with said bipolar states;

providing said multiplication to a switch that connects an antenna to at least one power splitter such that the antenna has a high impedance in the event a "1" is to be sent a low impedance in the event a "−1" is to be sent, wherein the at least one power splitter connects at least one matched load to the antenna, and wherein the matched load is also connected to the ground; and receiving a return signal from a modulated reflector, wherein the return signal has two reflection states;

switching the phase of the return signal between the two reflection states; and creating one or more subcarriers by switching the impedance between the two reflection states.

6. Apparatus for utilizing code division multiple access in modulated reflectance transmissions comprising:

square wave generation means for outputting square waves;

means for generating a phase-modulated reflectance data bit stream;

converter means for converting said data bit stream to bipolar states of "+1" and "−1;"

multiplication means for multiplying together said square waves and said bipolar states;

a switch receiving said multiplication for connecting an antenna to at least one power splitter such that the antenna has a high impedance in the event a "1" is to be sent a low impedance in the event a "−1" is to be sent, wherein the at least one power splitter connects at least one matched load to the antenna, and wherein the matched load is also connected to the ground; and one or more subcarrier, wherein the subcarriers are created by switching the impedance between two reflective states.

* * * * *